Sept. 30, 1930.  E. E. PIERCE  1,777,222
SOCKET TOOTH FOR EXCAVATING BUCKETS
Filed Jan. 12, 1929
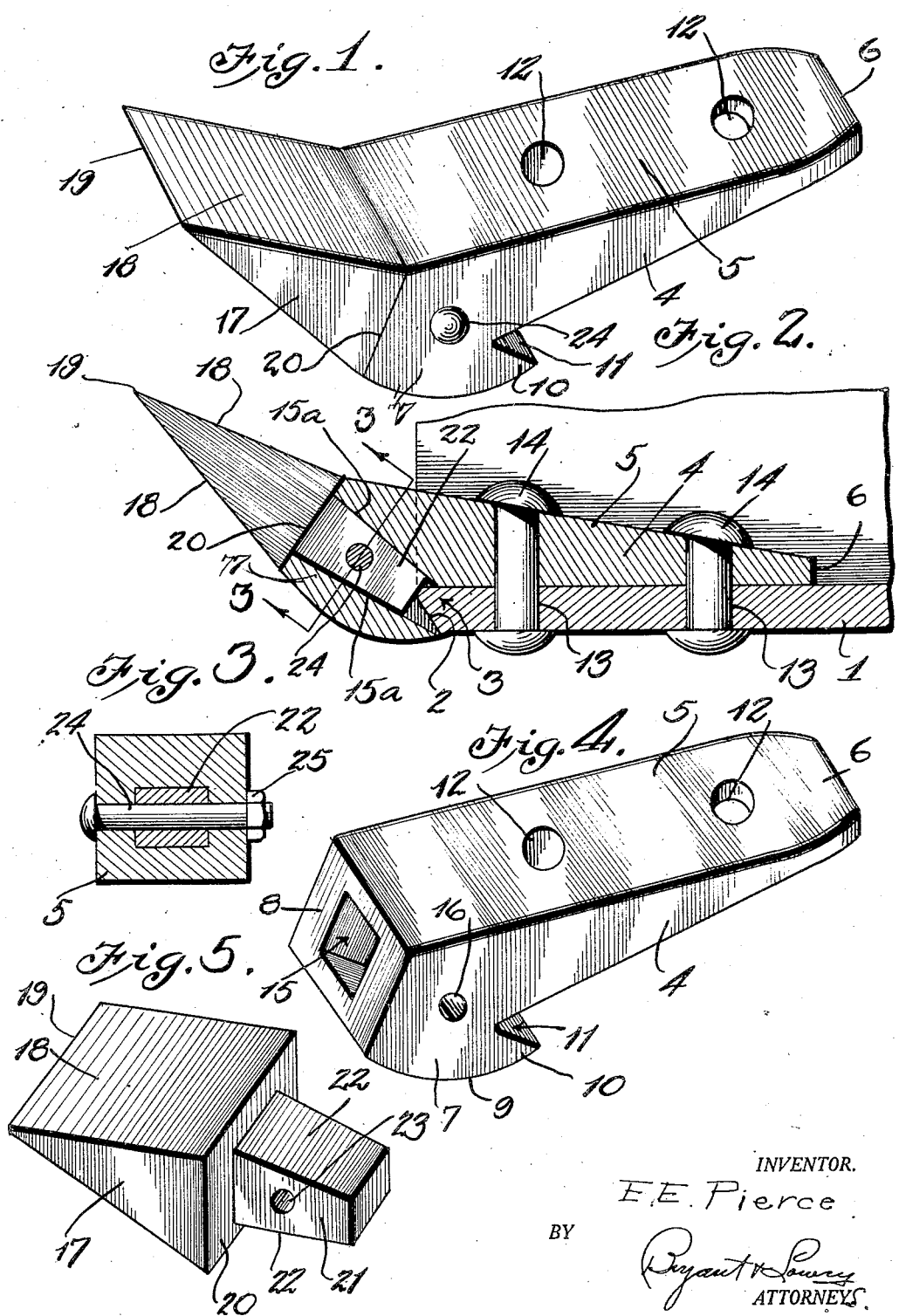
INVENTOR.
E. E. Pierce
BY
Bryant & Lowry
ATTORNEYS Patented Sept. 30, 1930

1,777,222

UNITED STATES PATENT OFFICE

EDWARD E. PIERCE, OF SACRAMENTO, CALIFORNIA.

SOCKET TOOTH FOR EXCAVATING BUCKETS

Application filed January 12, 1929. Serial No. 332,224.

This invention relates to certain new and useful improvements in a socket tooth for excavating buckets and has for its primary object a cut out tooth having a shank portion adapted for permanent connection with the edge of an excavating bucket with one end of the shank projecting beyond the edge of the bucket to which a strip or tooth is detachably connected so that in event of injury to the tooth, the same may be removed and a new one inserted in its place without the necessity of removing the carrying shank therefor from the excavating bucket.

A further object of the invention is to provide a socket tooth for excavating buckets of the above type in which the removable tooth of tapering form is so associated with the mounting shank to permit reverse position thereof in the mounting shank with the tooth extending therefrom at the same angle, thereby rendering it unnecessary to place the removable tooth in one position only for insertion in the mounting shank.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a perspective view of a socket tooth for excavating buckets constructed in accordance with the present invention;

Figure 2 is a vertical longitudinal sectional view of the socket tooth and a part of the excavating bucket showing the removable tooth disposed outwardly of the forward edge of the excavating bucket and the mounting shank for the tooth permanently attached to the bucket;

Figure 3 is a cross-sectional view taken on line 3—3 of Figure 2;

Figure 4 is a perspective view of the mounting shank for the removable tooth; and Figure 5 is a perspective view of the tooth detached from the mounting shank.

The socket tooth is illustrated as associated with an excavating bucket 1 having its forward edge beveled as at 2 forming a V-shaped end 3 as shown in Figure 2.

The socket tooth comprises a mounting shank 4 having an inclined top wall 5 tapering toward the inner end 6 providing an enlarged head 7 at its outer end. The forward end of the head is inclined as at 8 while the bottom side thereof is curved as at 9; the curved bottom 9 extending rearwardly of the head 7 as at 10 defining a V-shaped recess 11 between the head extension 10 and bottom face of the mounting shank 4, this construction being clearly shown in Figures 1 and 4. The mounting shank 4 is provided with a pair of spaced openings 12 adapted to register with spaced openings 13 provided in the bucket 1 when the mounting shank is placed on the bucket as shown in Figure 2, and when so disposed, the forward V-shaped end 3 of the bucket is received in the V-shaped recess 11 at the lower side of the mounting shank forming an interlocking connection between the mounting shank and bucket. Rivets 14 or other securing means are passed through the registering openings 12 and 13 in the mounting shank and bucket for permanently retaining the same assembled.

The head 7 of the mounting shank has an end opening socket 15 therein with the upper and lower walls 15$^a$ of the socket 15 converging rearwardly as shown in Figure 2. Bolt receiving openings 16 are formed transversely of the head 7, the openings 16 communicating with the recess 15. The removable socket tooth or shaft in Figure 5 is mounted in the recess 15, the socket tooth 17 being of triangular formation in side elevation with inclined side walls 18 merging into the cutting edge 19 at one end and into the base 20 at the other end, a tang 21 projecting centrally from the base 20 and having inclined top and bottom sides 22 for contacting the inclined walls 15$^a$ of the recess or socket 15. A transverse opening 23 is formed in the tank 21 and is adapted to register with the side openings 16 in the head 7 of the mounting shank 4. When the socket tooth 17 is disposed in the mounting shank as illustrated in Figures 1 and 2, the bolt 24 is passed through the openings 16 and 22 and receives a retaining nut 25 or the like upon one end thereof. With the socket tooth 17 so disposed, the same is entirely located beyond the forward edge of the excavating bucket 1 so that should injury result thereto, the tooth may be easily removed and replaced without disconnecting the mounting shank 4 from the excavating bucket.

From the above detailed description of the invention, it is believed that the construction and operation thereof will at once be apparent, and while there is herein shown and described the preferred embodiment of the present invention, it is nevertheless to be understood that minor changes may be made therein without departing from the spirit and scope of the invention as claimed.

I claim:—

A tooth for excavating buckets comprising a single piece shank having a flat upper surface bored for the reception of fastening bolts and a head with a flat beveled front end, a curved lower portion terminating in an angular notch for engagement with a bucket, said beveled end facing upwardly and obliquely and said head having a central tapered socket, and having mounted thereon a V-shaped tooth provided with a tapering tang fitted to said socket, and secured therein by a removable transverse bolt.

In testimony whereof I affix my signature.

EDWARD E. PIERCE.